United States Patent [19]
Clare et al.

[11] Patent Number: 5,898,286
[45] Date of Patent: Apr. 27, 1999

[54] DIGITAL SERVO CONTROL SYSTEM FOR A DATA RECORDING DISK FILE WITH IMPROVED SATURATION MODELLING

[75] Inventors: Donald Lee Clare, Morgan Hill; Louis Joseph Serrano, San Jose, both of Calif.

[73] Assignee: International Business Machines Corporation, Armonk, N.Y.

[21] Appl. No.: 08/782,730

[22] Filed: Jan. 13, 1997

[51] Int. Cl.$^6$ .................................................. G11B 21/08
[52] U.S. Cl. ..................... 318/569; 318/636; 360/78.09
[58] Field of Search ............................... 318/561, 567, 318/569, 590, 619, 626, 632, 636, 687; 360/75, 77.04, 77.05, 78.01, 78.04, 78.09, 78.12

[56] References Cited

U.S. PATENT DOCUMENTS

| | | | |
|---|---|---|---|
| 4,575,776 | 3/1986 | Stephens et al. | 318/561 X |
| 4,679,103 | 7/1987 | Workman | 360/77 |
| 4,691,152 | 9/1987 | Ell et al. | 318/616 |
| 4,697,127 | 9/1987 | Stich et al. | 318/561 |
| 4,835,633 | 5/1989 | Edel et al. | 360/78.12 |
| 4,914,644 | 4/1990 | Chen et al. | 369/43 |
| 4,988,933 | 1/1991 | Ogawa | 318/561 |
| 5,119,250 | 6/1992 | Green et al. | 360/78.06 |
| 5,497,059 | 3/1996 | Tajima et al. | 318/561 |
| 5,585,976 | 12/1996 | Pham | 360/77.04 |

FOREIGN PATENT DOCUMENTS 5266615  10/1993  Japan .

*Primary Examiner*—Bentsu Ro
*Attorney, Agent, or Firm*—John H. Holcombe

[57] ABSTRACT

Disclosed is a digital control servo system for read/write head positioning in data recording disk files of the type which use voice coil motor (VCM) actuators for positioning the head, with improved modelling of the servo system in saturated seek mode. The VCM has a characteristic torque factor which varies in accordance with a predetermined relationship to head position and with age and temperature, and the servo system drives the VCM in a saturated seek mode at a maximum level of current which has a low frequency variation due primarily to temperature change. The servo system computes an estimated VCM control representing the VCM current, computes estimates of the state of the VCM including head position and velocity, and computes from an algorithmic model, predictions of head position and velocity. The improved modelling changes the algorithmic model to reflect the actual torque factor of the VCM and actual maximum level of current in saturated seek mode rather than nominal torque factor and VCM current. The preferred method is to employ scaling factors representing the ratio of measured torque factor to nominal torque factor, and representing the ratio of measured maximum level of current to nominal, to scale the model, and then to compute predictions of the state of the VCM in saturated seek mode from the scaled model and the current values of the states.

20 Claims, 11 Drawing Sheets

DIGITAL SERVO CONTROL SYSTEM FOR A DATA RECORDING DISK FILE WITH IMPROVED SATURATION MODELLING

TECHNICAL FIELD

This invention relates to digital control systems for read/write head positioning in data recording disk files of the type which use voice coil motor (VCM) actuators for positioning the head. More particularly, the invention relates to improved modelling of the servo system in saturated seek mode.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. The movement of the head to a desired track is referred to as track accessing or "seeking", while the maintaining of the head over the center line of the desired track during a read or write operation is referred to as "track following".

The actuator is typically a "voice coil motor" (VCM) which comprises a coil movable through the magnetic field of a permanent magnetic stator. The application of current to the VCM causes the coil, and thus the attached head, to move radially. In the absence of bias forces, the acceleration of the coil is proportional to the applied current. This current is applied by a power amplifier in response to a control input. If the input control is small enough, then the applied current is proportional to the control input and the power amplifier is nonsaturated; if the control input is too large, the applied current reaches a maximum possible value, and the power amplifier is saturated.

In disk files which have a relatively high density of data tracks on the disk, it is necessary to incorporate a servo control system to efficiently move the head between tracks and to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline and to detect the track number or position sample.

In a disk file digital servo control system, a microprocessor utilizes a control signal algorithm to calculate a digital control signal based upon the digital values of certain state variables such as head position, VCM current and head velocity. The digital control signal is converted to an analog signal and amplified to provide input current to the VCM. Such a digital servo control system is described in assignee's U.S. Pat. No. 4,679,103 incorporated by reference herein, and is a system which, as part of the computation of the control signal to the actuator, makes use of the state estimator algorithm to estimate the state (i.e., position, velocity and acceleration or current input to the VCM) of the head. In this type of system, a microprocessor receives, at discrete sample times, digital values corresponding to the PES, position sample, and the VCM input current, and computes, through the use of the state estimator algorithm, a digital control signal. The digital control signal is then converted to an analog signal to provide a power amplifier control signal. A power amplifier then generates a new VCM input current. The method of estimating the state of the physical plant to be controlled in such a digital servo control system requires the use of estimator constants, the derivation of which is described in *Digital Control of Dynamic Systems*, Franklin and Powell, Addison-Wesley Publishing Co. (1983), chapter 6, pages 131–139. In the case of a disk file, these estimator constants are dependent upon the values of certain physical parameters of the disk file, such as the moving inertia of the coil and head/arm assembly, the VCM force, or torque, factor (the torque applied to the coil per unit of input current), the gain of the VCM power amplifier, the PES gain and the time between PES samples (the PES sampling time).

The VCM current is fed back directly to the input to the power amplifier where it is summed with the analog control signal. This effectively changes the integrating power amplifier into a low pass filtering power amplifier, with linear input output characteristics. Thus, when the power amplifier is not saturated, the VCM current and state of the head can be easily modeled, based upon the linear characteristics of the servo system. During long seeks, when the power amplifier is saturated, the linear model is not accurate. During this phase of operation of the disk file, the servo system operates in open loop and the state estimator algorithm is modeled based upon the known VCM characteristics during saturation. The saturation model of VCM current incorporates the effects of both the back electromotive force (back EMF) and the coil current rise time.

The microprocessor in the digital servo control system determines which VCM current model to use by a determination of when the power amplifier is in saturation. In the example described in assignee's U.S. Pat. No. 4,914,644, the microprocessor determines power amplifier saturation based upon a value of the velocity error, which is the difference between the commanded velocity and the estimated velocity. When the velocity error is larger than a predetermined threshold, then the power amplifier is thought to be saturated and the saturation model is used.

The prior art patents discuss changes to the linear non-saturated model resulting in modifications to the control signal so as to make the VCM more precise or to more quickly position the head correctly. In assignees' U.S. Pat. No. 4,835,633, which is incorporated herein by reference, the actual current input to the VCM is fed back to the nominal prediction model and, in the '644 patent, the actual current is estimated using a nominal current model and fed back to the nominal prediction model to estimate the next position of the head. The torque factor, as shown by the '633 patent, varies over the length of the stroke by up to 17% and can vary from device to device and over time in the same device, accounting for some modelling error. In addition, the assignee has found that the torque factor may vary by an additional 4% with temperature.

The '633 patent takes temperature change into account with respect to the torque factor as part of a measurement of the current state of the linear acceleration factor, but does not consider the change in the saturated seek mode, as the mode operates only at maximum current which is not subject to changes in the control.

Japanese published patent application 5-266615 measures the temperature directly in the magnetic circuit and measures the driver current flow directly, deducing the corresponding temperature. From a stored lookup table, the decrease in the torque constant is found and is used to adjust the gain of the linear servo loop, so that overall stability is improved.

The prior art patents, however, use only a nominal saturated model because the system is operating in open loop with the control signal at the level required to maintain the maximum current to the VCM actuator. The major problem described, for example, in assignee's U.S. Pat. No. 4,697,127, at col. 9, 11. 51–56 is that the coil resistance (and therefore, the maximum servo current) in saturated seek mode, indeed, even during nonsaturated seek, varies up to 30% with temperature. Therefore, the nominal model is built with sufficient safety to account for the worst case of this parameter.

Assignee's U.S. Pat. No. 5,119,250 attempts to overcome the difficulty of using the worst case model by modifying the point at which the current is switched from acceleration current to deceleration current, but still within a velocity profile which assumes the worst case conditions.

Whether or not the worst case model is used, an important problem in using the nominal model to predict the position and velocity of the VCM, is that the error between the predicted position and actual position at each servo sample time may become large. Typically, this error is integrated during the seek to provide a corrective "dynamic windage" term that is added to the control. If the error is large, this term will increase in size ("windage windup"), and the resulting control may be too large to "unwind" in time, resulting in overshoot of the target. Additionally, the windage estimate is typically used to provide the initial linear model static windage estimate such that the error will degrade the settle characteristics and likely the settle time of the seek.

SUMMARY OF THE INVENTION

Disclosed is an improved modelling of the servo system in saturated seek mode. The VCM has a characteristic torque factor which varies in accordance with a predetermined relationship to head position and in accordance with temperature change, and the servo system drives the VCM in a saturated seek mode at a maximum level of current which has a low frequency variation due primarily to temperature change. The servo system computes an estimated VCM control representing the VCM current, computes estimates of the state of the VCM including head position and velocity, and computes from an algorithmic model, predictions of head position and velocity. The improved modelling changes the algorithmic model to reflect the actual torque factor of the VCM and actual maximum level of current in saturated seek mode rather than nominal torque factor and nominal VCM current. The preferred method is to employ scaling factors representing the ratio of measured torque factor to nominal torque factor, and representing the ratio of measured maximum level of current to nominal, to scale the model, and then to compute predictions of the state of the VCM in saturated seek mode from the scaled model and the current values of the states.

For a fuller understanding of the present invention, reference should be made to the following detailed description taken in conjunction with the accompanying drawings.

BRIEF DESCRIPTION OF THE DRAWINGS

FIG. 3b is a representation of the gain applied to the control signal obtained by inversion of the acceleration factor of FIG. 3a.

DESCRIPTION

Prior Art

Figure 1:
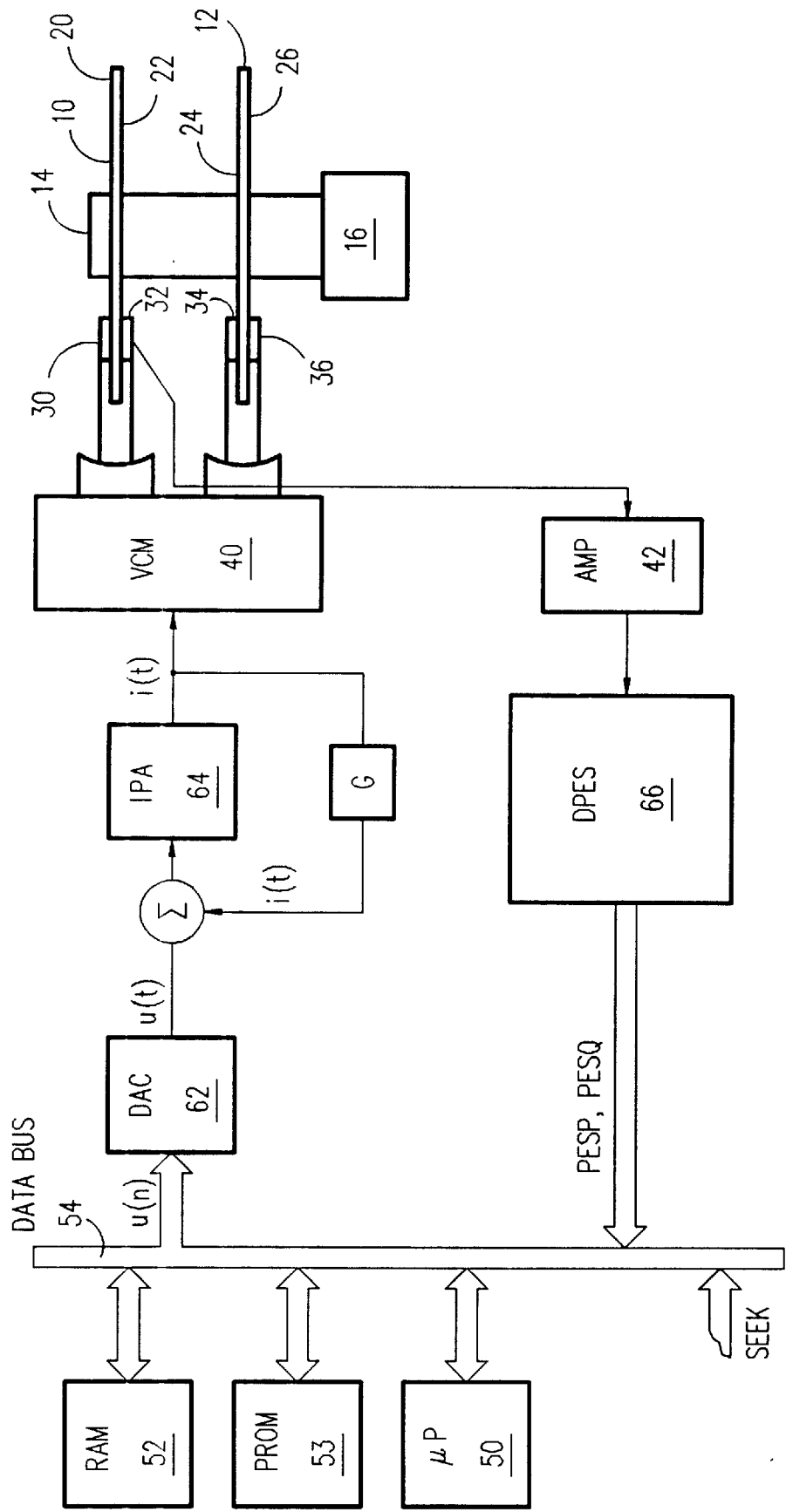
FIG 1 is a block diagram of a prior art digital servo control system which is employed in the present invention.

Referring first to FIG. 1, there is depicted a simplified block diagram of the digital servo control system described in U.S. Pat. No. 4,914,644, which is incorporated herein by reference. A pair of disks 10, 12 are supported on a spindle 14 of the disk file drive motor 16. Each of the disks 10, 12 has two surfaces 20, 22 and 24, 26, respectively.

Preferably, servo information is provided on each of the surfaces and is recorded in angularly spaced sections along concentric tracks, with the position information typically written in such a manner that the intersections of adjacent servo tracks in the servo sectors are radially aligned with the centerlines of the data tracks.

The specific tracks on the surfaces of the disk are accessed by heads 30, 32, 34, 36, each of which is associated with a respective disk surface and supported by an associated arm assembly. The heads 30, 32, 34, 36, are all maintained in a fixed relationship with one another relative to their radial position on their respective disk surfaces. As an alternative to the preferred sector servo architecture, one of the surfaces may be a dedicated servo surface. The servo information read by the servo head or selected head 32 is input to amplifier 42 and digitizing PES channel (DPES) 66, which provides the head position information PESP and PESQ. The DPES 66, presents head position information in a digital word. Alternatively, analog to digital (A/D) converters and demodulators may be used to supply the head position information. The discrete values of PESP and PESQ at any sample time are designated PESP(n) and PESQ(n), where n represents a time index for each digital sample.

A microprocessor 50 is connected by data bus 54 and an address bus (not shown) to suitable memory devices, such as read/write memory (RAM) 52 and programmable read only memory (PROM) 53. Microprocessor 50 utilizes a control signal algorithm, as described in the '644 patent, to generate a control signal u(n). The control signal u(n) is output to digital-to-analog converter (DAC) 62 and integrated and amplified by integrating power amplifier (IPA) 64 to generate an analog current i(t) to VCM 40. The analog current i(t) is fed back to the input of IPA 64, where the VCM current is summed with the analog control signal, u(t). In the actual hardware implementation, a gain, G, is provided in the feedback path to match the desired bandwidth of IPA 64. This feedback path essentially converts IPA 64 into a low pass filtering power amplifier with linear characteristics which accounts for effective resistance variation due to back EMF and voltage variation. The VCM current can then be accurately estimated when IPA 64 is operating in its linear range, i.e., during track following and during seeks when the control is small. Microprocessor 50 thus receives as inputs, at discrete sample times, the digital head position error signals PESP(n) and PESQ(n). Microprocessor 50 computes the actual head position, or position sample, from the values and timing of PESP(n) and PESQ(n), using conventional logic. Also shown as input to microprocessor 50 via data bus 54 is a seek command signal from the disk file control unit (not shown). The seek command signal is a digital value which identifies the target track to which the heads are to be repositioned.

Figure 2:
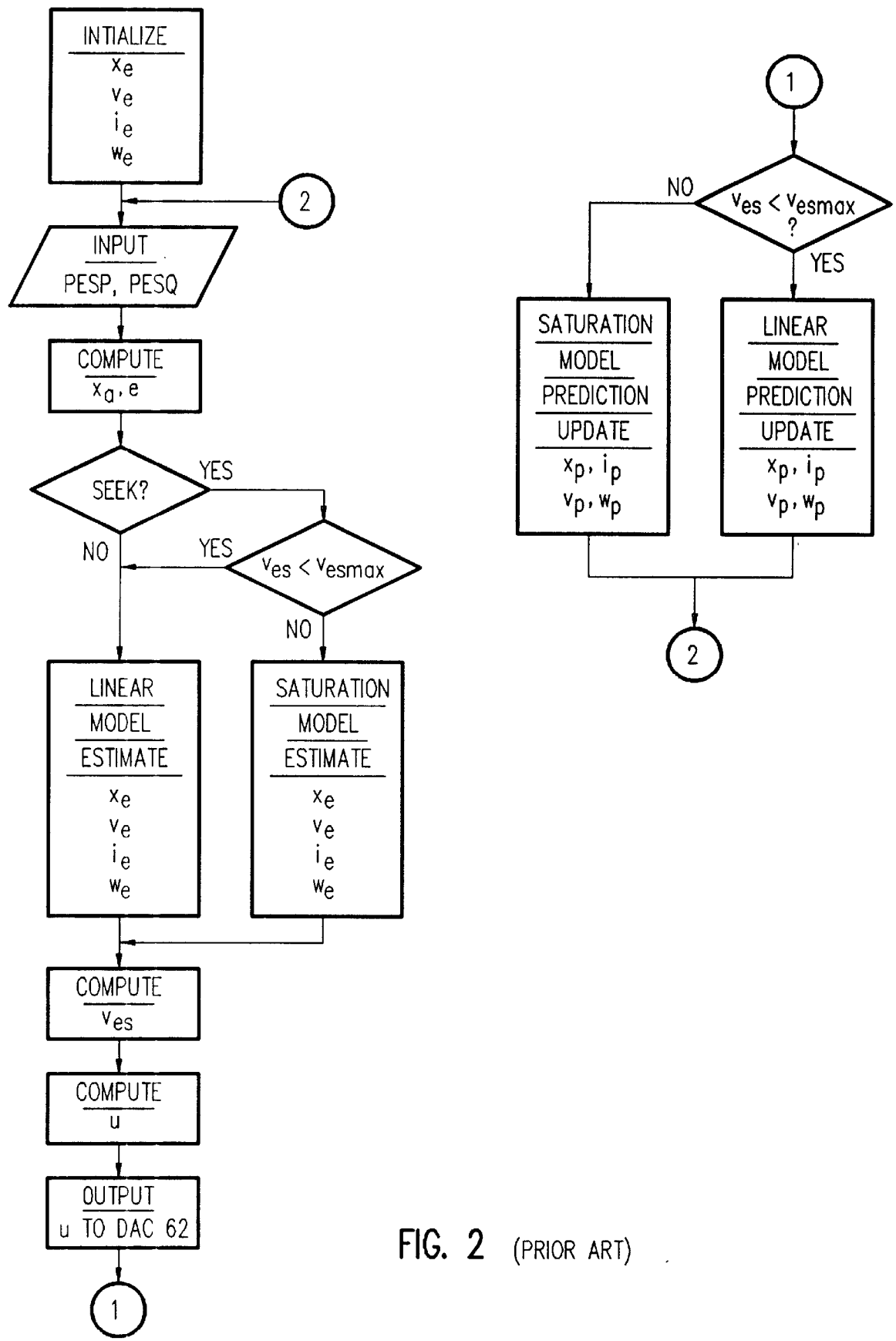
FIG. 2 is a flow chart of a state estimator algorithm which is employed in the digital servo control system of FIG. 1.

A simplified flow chart for the state estimator algorithm, which is more fully described in the '644 patent, is illustrated in FIG. 2. Referring to the INITIALIZE block in FIG. 2, there are four state variables: head position $x_e$, head velocity $v_e$, VCM current $i_e$, and windage $w_e$. Following the initialization of these estimated values, the digital values of PESP and PESQ are INPUT to microprocessor 50 from DPES 66. As indicated in the next COMPUTE block, the microprocessor then computes the head position $x_a$ and estimator error e.

Following the computation of $x_a$ and e, a SEEK determination is made. If the servo system is not seeking, i.e., causing the heads to move from one data track to another, then the servo system is in the track following mode. The four state variables are then estimated in the LINEAR MODEL ESTIMATE block according to the equation described in the '644 patent.

Next, the velocity error signal, $v_{es}$, is computed. The control signal u is then computed and OUTPUT to DAC 62. Following the OUTPUT of u, a decision point is reached to determine which of the two VCM current models to use for the estimator state PREDICTION UPDATE phase. If the velocity error signal $v_{es}$ is less than an experimentally predetermined threshold, noted as VESMAX, then this is an indication that the power amplifier is not saturated, and the algorithm branches to the LINEAR MODEL PREDICTION UPDATE block. Generally, this means that the control is small enough that the power amplifier is not saturated.

The continuous time model of the VCM in its linear mode is described in detail in the '644, patent. The model employs a LaPlace operator, $K_v$, the acceleration factor, which is the torque factor $K_f$ divided by the inertia M of the movable portion of the VCM and head arm assembly, and $K_x$, which is the PES gain. The windage term w is represented as an uncontrolled input which is summed with the current output i from IPA 64 for input to VCM 40 in FIG. 1.

Still referring to the flow chart (FIG. 2), at the SEEK decision block, if a seek is in progress, then the algorithm branches to a decision block comparing $v_{es}$ to VESMAX. If a seek is in progress and $v_{es}$ is less than VESMAX, then this is an indication that the control will be small and the algorithm branches to the LINEAR MODEL ESTIMATE block for the computation of the estimated state variables based on the linear model of VCM current as previously described. If, on the other hand, the decision is that the power amplifier is saturated, i.e., if $v_e = \geq$ VESMAX, then the algorithm branches to the SATURATION MODEL ESTIMATE block for the computation of the estimated state variables based on the saturation model of VCM current.

After the estimated state variables are computed according to the '644 patent as modified with the saturation model, a new $v_{es}$ is computed. The control signal u is computed and OUTPUT to DAC 62. The $v_{es}$ term is then compared with VESMAX, and, since the control is large, this decision block causes the algorithm to branch to the SATURATION MODEL PREDICTION UPDATE phase utilizing the saturation model for VCM current. The continuous time model of the power amplifier and VCM when the power amplifier is saturated is described in the '644, patent. The saturation model of the VCM current includes the effect of back EMF and the coil current rise time.

Referring again to the flow chart of FIG. 2, after the predicted values have been updated by use of either the linear or saturation model of VCM current, the microprocessor 50 is ready to receive the next values of PESP and PESQ. These values will be used, together with the updated predicted values of the state variables, including the predicted value of VCM current, to compute the estimated values of the state variables and the next control signal.

Still discussing the prior art, the '633 patent points out that the value of the torque factor $K_f$, or the acceleration factor $K_f/M$, where M is the inertia of the movable portion of the VCM and the attached head/arm assembly, must be known in order to accurately generate the control signal in linear or nonsaturated seek mode.

In the case of a disk file with a state estimator algorithm forming a part of a digital servo control system, the acceleration factor is also important to compute an estimate of head position and velocity in nonsaturated seek mode.

Figure 3A:
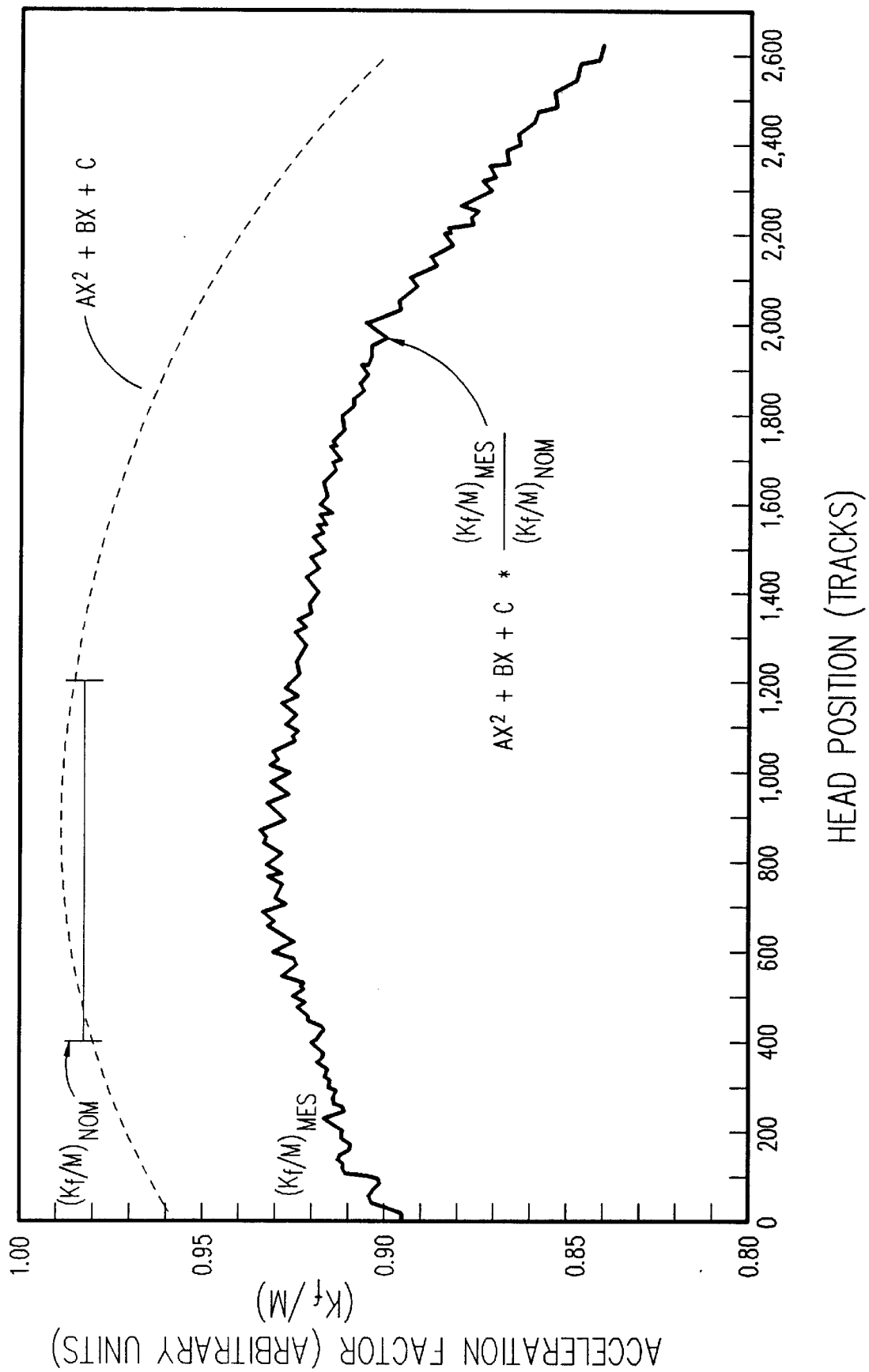
FIG. 3a is a representation of the average acceleration factor as a function of head position, with position given in units of tracks.

The manner in which the actual $K_f/M$ is calculated for a specific disk file is explained with reference to FIG. 3a. The dashed line in FIG. 3a is a representation of the average acceleration factor as a function of head position, with position given in units of tracks. This relationship is determined experimentally by testing samples of disk files, testing the specific disk file many times, or by computation, based upon known values of the VCM parameters. The solid line in FIG. 3a is a representation of the actual acceleration factor as a function of head position for a specific disk file at a specific age, under specific operating conditions, and at a specific temperature. The relationship of acceleration factor with head position has the same general shape for both the nominal VCM and the actual VCM. However, the two curves are displaced by an amount equal to the vertical displacement between the average acceleration factor and the actual acceleration factor. This difference is essentially a constant value, regardless of head position.

As shown, the nominal acceleration factor $(K_f/M)_{NOM}$ is selected to be the acceleration factor at approximately the mid-band of data tracks, which is a range over which there is minimal variation in force factor with head position. This value of the nominal acceleration factor is stored in PROM 53 and is the same value for all disk files. For example, as illustrated in FIG. 3a the value of $(K_f/M)_{NOM}$ (shown as the straight solid line) stored in PROM 53 is the average acceleration factor (dashed line) taken between tracks 400 and 1200, and is a value of approximately 0.985, in arbitrary units.

Figure 3B:
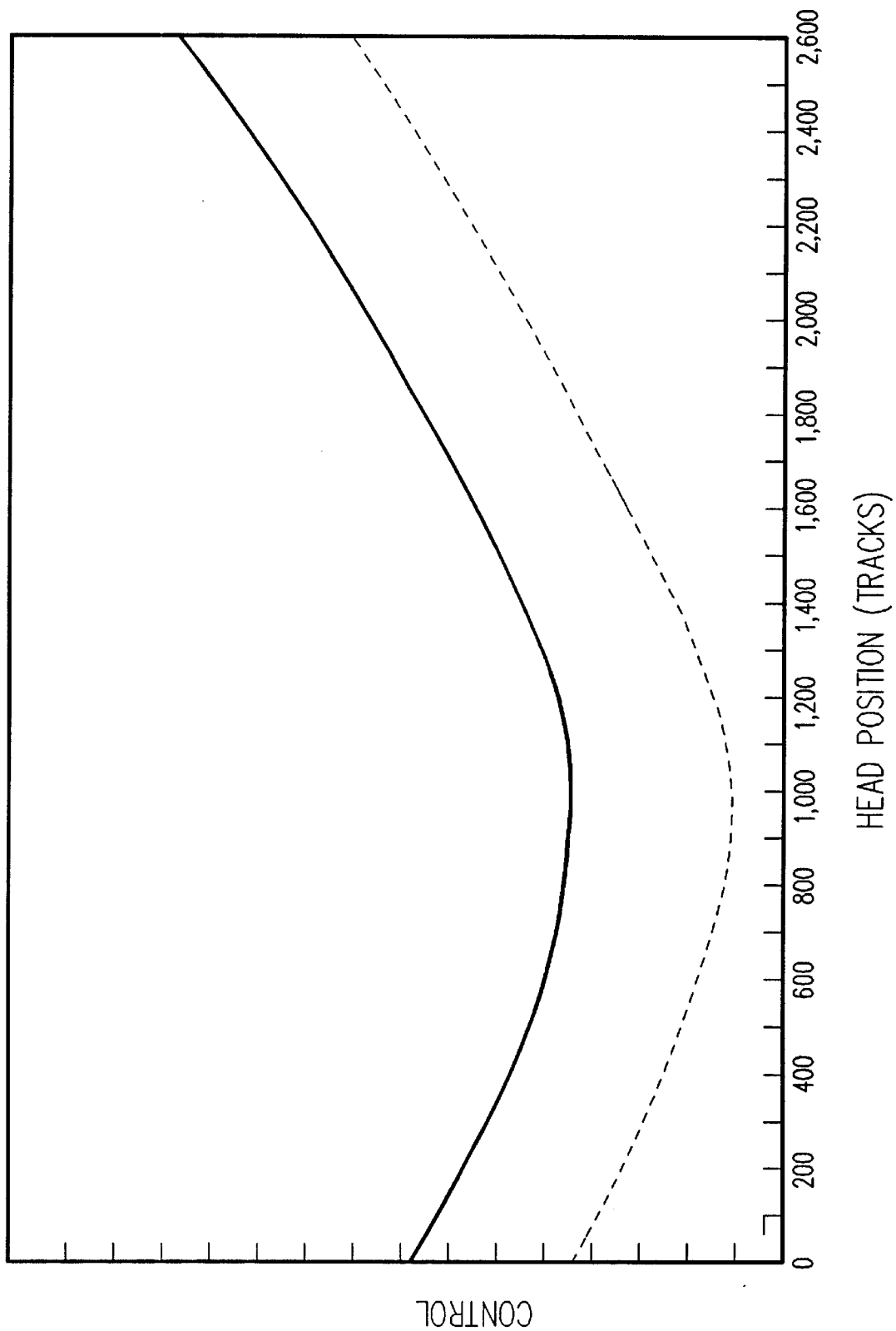

The computation for the measurement of the actual acceleration factor $(K_f/M)_{MES}$ occurs every time the disk file servo control system is initialized, which is referred to as a "re-zero". A re-zero occurs every time the disk file is first powered on and at other times on selection by the user. As part of the re-zero process, a forward seek is performed between tracks 400 and 1200. During the seek, the value of VCM current, less that component due to windage, is summed for each control signal calculation and this sum is stored in RAM 52. (The equivalent current due to windage is referred to as "$w_e$" and is provided by the state estimator.) At termination of the acceleration portion of the seek, the estimated velocity is also stored in RAM 52. The actual measured acceleration factor $(K_f/M)_{MES}$, which is the average acceleration factor between tracks 400 and 1200, is then calculated as described in the '633 patent. Preferably, a seek is also performed in the reverse direction and $(K_f/M)_{MES}$ is calculated. The two values are then averaged to generate the actual $(K_f/M)_{MES}$ which compensates for windage and is used to compensate for the nominal $(K_f/M)_{NOM}$ stored in PROM 53. The compensation factor for the control is illustrated in FIG. 3b, and is the inverse of the acceleration factor of FIG. 3a.

Figure 4:
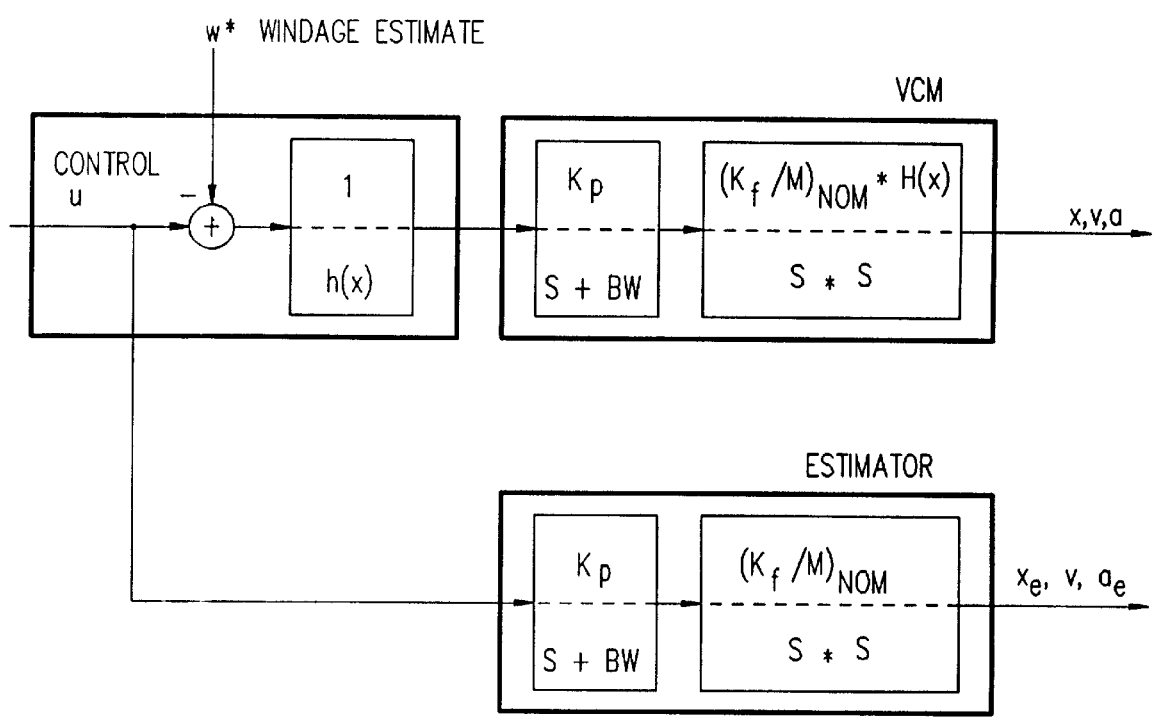
FIG. 4 is a flow chart of the manner in which the control signal is modified in the digital servo control system of FIG. 1.

The manner in which the control signal is modified in a digital servo control system with a state estimator is illustrated in FIG. 4. The H(x) block is $(K_f/M)(x)/(K_f/M)_{NOM}$ and represents the acceleration factor variations in the VCM under control. The h(x) block is $(K_f/M)_{NOM}(x)/(K_f/M)$ and represents the modification to the control signal which will force the VCM inputs (head position "x", velocity "v", and acceleration "a") to the estimator to more closely represent the inputs from a nominal VCM. To clarify, h(x)*H(x)=1. The w* term in FIG. 4 is the current required to exactly counteract DC forces (called "windage") that effect the actuator. It is not an input to the estimator, since the estimator is unaffected by the DC forces. The unmodified control signal "u" is an input to the estimator. Thus, the state estimator functions as a nominal state estimator, without any modifications to the estimator constants.

Preferred Embodiments

As discussed above, the object of this invention is to improve the Saturation Model used to Predict and Update the head position, velocity and current as shown in FIG. 2. This is accomplished by improving the estimate of acceleration by accounting for variations in torque factor, saturated coil current, and bias forces.

The result of improving the saturation model is to reduce the error between the predicted position $x_p$ and actual position $x_a$ at each servo sample time. Typically, this error is integrated during the seek to provide a corrective "dynamic windage" term $w_e$ that is added to the control. If the error is large, this term will increase in size ("windage windup"), and the resulting control may be too large to "unwind" in time, resulting in overshoot of the target. Additionally, the windage estimate $w_e$ is typically used to provide the initial Linear Model static windage Estimate in FIG. 2 (see Franklin, et al., supra) such that the error will degrade the settle characteristics and likely the settle time of the seek.

Figure 5:
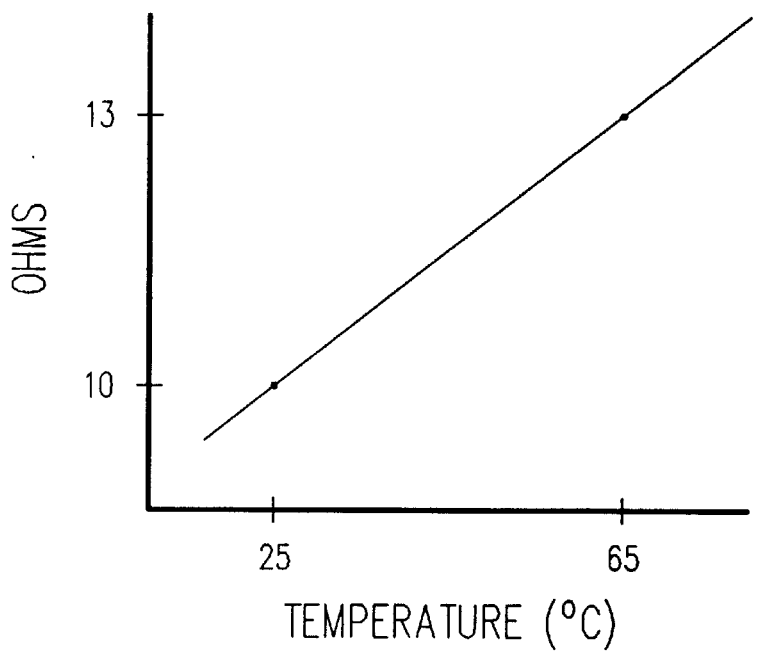
FIG. 5 is a graph of coil resistance versus temperature for an exemplary disk file.

FIG. 5 is a graph of coil resistance versus temperature for an exemplary disk file. The graph shows the resistance of the coil increasing by 30% within the operating temperature range of the drive. The voltage of the power supply is limited to a fixed voltage, for example 12 volts. If the coil resistance at 25 degrees C. is 10 ohms, then the largest current that can be supplied by the IPA 64 in FIG. 1 is 1.5 amps. Because the back EMF must be overcome as velocity increases, this maximum decreases with speed. The back EMF is compensated for in linear seek mode by the power amplifier design, but is significant in saturation seek mode, and is taken into account in the Saturation Models. At an operating temperature of 65 degrees C., the resistance of the coil is 13 ohms and maximum current input to the VCM is only 1.15 amps. Because the acceleration of the head is directly related to the current, the acceleration will also be decreased 30% at 65 degrees C. from that at 25 degrees C. If the Saturation Models are designed for the worst case of 65 degrees C., then the models of the prior art will estimate at 25 degrees C. an acceleration $a_e$ 30% less than the actual, and the predictions and updates of position x between position samples resulting from the models will be 30% short of actual on acceleration and 30% farther than actual during deceleration.

Figure 6:
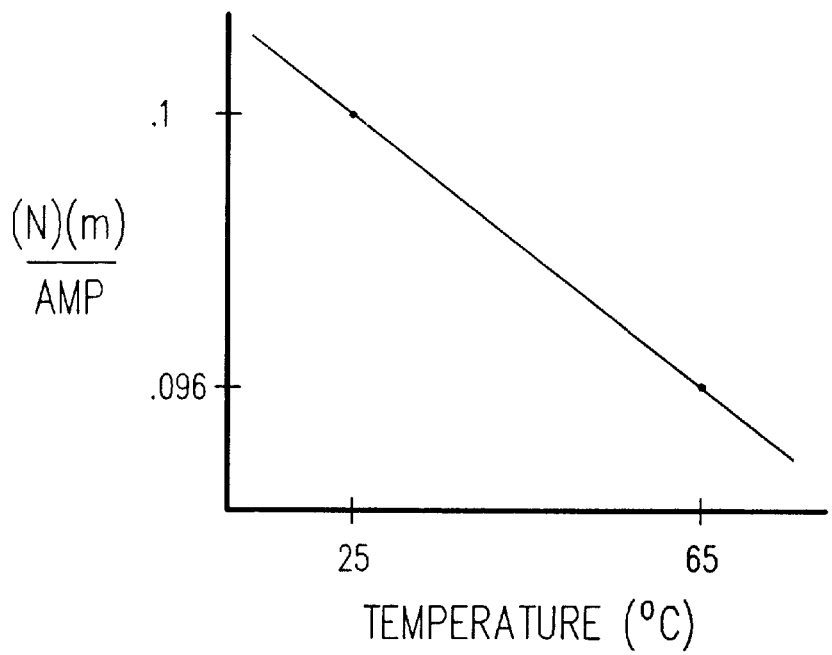
FIG. 6 is a graph of torque factor versus temperature for an exemplary disk file.

FIG. 6 is a graph of torque factor versus temperature for an exemplary disk file. The graph shows the torque factor decreasing 4% within the operating temperature range of the drive. Similarly, if the Saturation Models are designed for the worst case of 65 degrees C., then the models of the prior art will estimate at 25 degrees C. an acceleration $a_e$ 4% less than the actual, and the predictions and updates of position x between position samples resulting from the models will be another 4% short of actual on acceleration and 4% farther than actual during deceleration.

Figure 7:
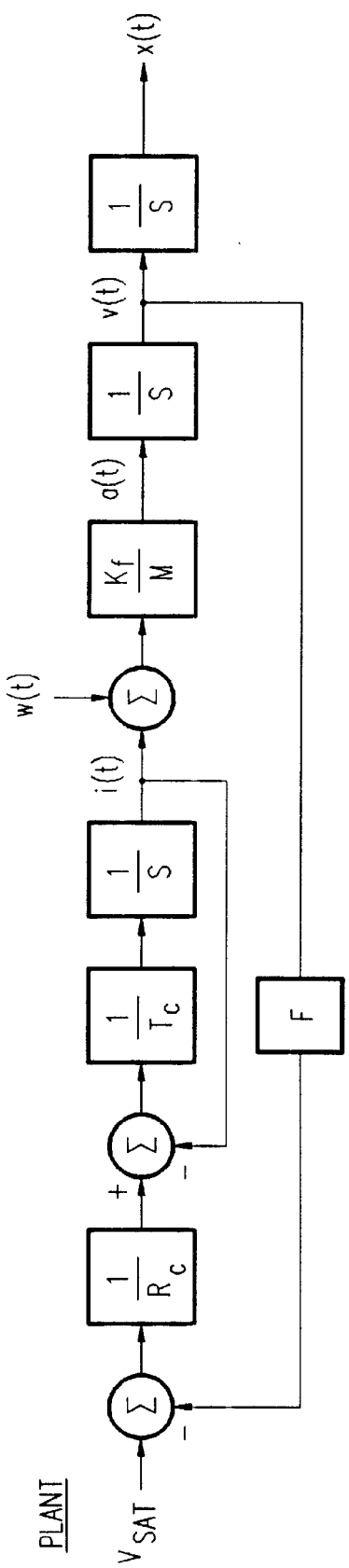
FIG. 7 is a continuous time representation of the plant during saturation comprising the servo system of FIG. 1.
Figure 8:
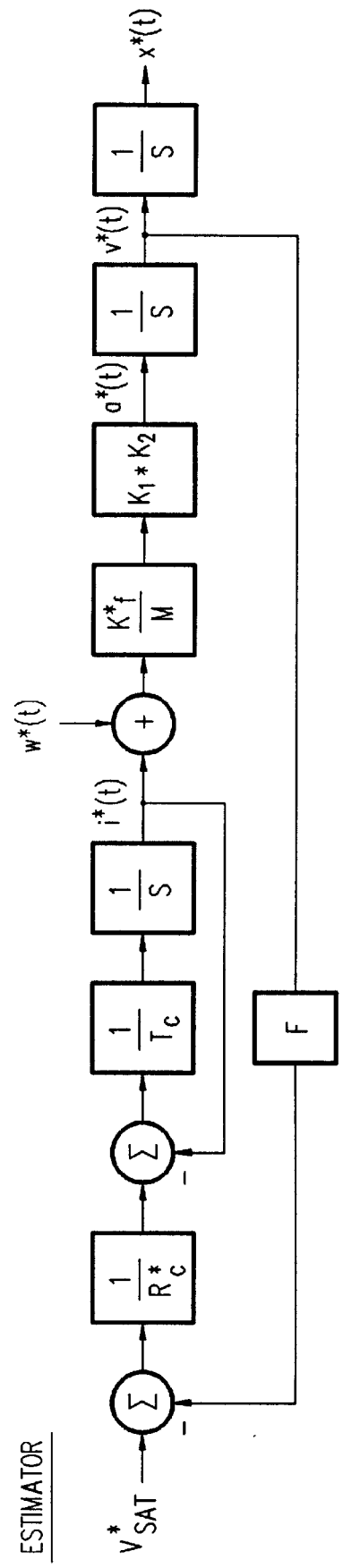
FIG. 8 is a continuous time representation of the saturation model equivalent to the plant shown in FIG. 7.

A continuous time representation of the plant is shown in FIG. 7 and an equivalent continuous time representation of the saturation model is shown in FIG. 8. The continuous time representation is used in FIG. 8 for ease of description, but the preferred implementation of the estimator model as shown in FIG. 2 is a discrete time process.

In FIG. 7:

$V_{sat}$ is the maximum voltage of the power supply;
$R_c$ is the coil resistance, which varies;
$T_c$ is the time constant of the coil due to resistance and inductance;
i(t) is the coil current;
$K_f$ is the torque factor, which varies;
M is the inertia;
$K_f/M$ is the acceleration factor;
w(t) is windage;
F is the back EMF constant in V/(m/s)
a(t) is acceleration;
v(t) is velocity;
x(t) is position.

In the estimator model of FIG. 8:

$V^*_{sat}$ is the nominal maximum voltage of the power supply;
$R^*_c$ is the nominal coil resistance;
i*(t) is the estimated coil current;
$K^*_f$ is the nominal torque factor;
M is the inertia;
$K_f/M$ is the acceleration factor;
w*(t) is the estimated windage;
$K_1$ is the ratio of measured to nominal torque factor;
$K_2$ is the ratio of measured to nominal maximum acceleration;
a*(t) is estimated acceleration;
v*(t) is estimated velocity;
x*(t) is estimated position.

The prior art patents discuss scaling or modifying the control signal in linear nonsaturated mode so as to make the VCM more precise or more quickly position the head correctly. The prior patents use this scaling in order to make the plant behave as a nominal plant. This does not work in the saturation model, since the control cannot be increased as needed, because the power amp is saturated. They, therefore, use a nominal saturated model because the only control signal needed is that required to maintain the maximum current to the VCM actuator.

The improved modelling of the servo system of the invention comprises $K_1$ and $K_2$ in saturated seek mode together with incorporation of the estimated static windage into the predictions made by the saturated model. The object of $K_1$ and $K_2$ is to change the model to look like the plant. With respect to the change in torque, the invention is to provide the ratio of measured torque factor to nominal torque factor $K_1$ to change the saturation model in accordance with changes of the torque factor.

One approach would be to use the information comprising the average algorithm defining the solid curve in FIG. 3b, which is used in the linear nonsaturated control, and to invert the information, for example by means of a Taylor series, to correct the torque factor from nominal for the head position. The information is inverted because it is used to change the model, as opposed to the linear model where the information in FIG. 3b is used to update the control.

In the preferred embodiment, use is made of the linear model, described in detail in the '633 patent. The model includes the average algorithm representing the nominal characteristic torque factor which varies in accordance with head position, and calculates the ratio of nominal to measured torque factor to generate the corrected nonsaturated control. The preferred embodiment of the invention uses the result of the linear model computation, inverts the result, again because it is used to change the model, and corrects the estimated acceleration a*(t), and thereby changes the estimated velocity v*(t) and position x*(t).

As discussed, the maximum level of current in the saturated seek has a low frequency variation due primarily to change in the coil resistance due to temperature change. The result of the variation is to alter the acceleration of the head in direct proportion. The invention is to provide the ratio of measured to nominal maximum acceleration $K_2$.

In the preferred embodiment, the ratio is measured by conducting a saturated seek over a known measurement time, and, after correcting for the torque factor variation, calculating the ratio of actual to expected distance travelled. To take into account the windage, the preferred embodiment performs a saturated seek in the opposite direction, again calculates the ratio, and averages the result. The average of the two ratios is approximately the ratio of the measured acceleration to nominal.

A further adjustment to the saturation model is to account for the estimated static windage that affects the VCM during the seek. In the linear mode, the estimate of the force is substracted from the control so that the net effect on the actuator is zero. Since the control cannot be adjusted during saturation, the estimated static windage is added to the control to the estimator; this improves the estimate since it now more closely models the actual plant.

The improved modelling changes the algorithmic model to reflect the actual torque factor of the VCM and actual maximum level of current in saturated seek mode rather than nominal torque factor and VCM current. The scaling factors $K_1$ and $K_2$ represent the ratio of measured torque factor to nominal torque factor, and represent the ratio of measured maximum level of current to nominal, respectively, and are used to compute predictions of the state of the VCM in saturated seek mode from the scaled control and the current values of the states.

Figure 9:
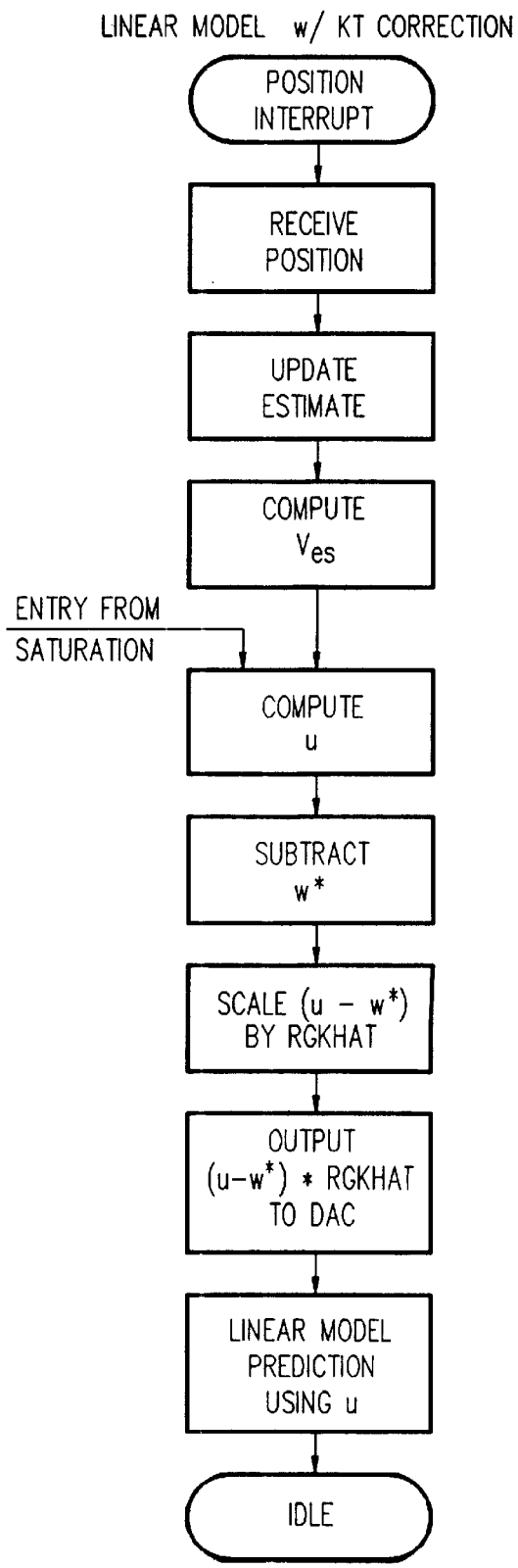
FIG. 9 illustrates a flow chart for the state estimator nonsaturated Linear Model Estimate and the Linear Model Prediction and Update shown in FIG. 2.

FIG. 9 illustrates a flow chart for the state estimator nonsaturated Linear Model Estimate and the Linear Model Prediction and Update shown in FIG. 2, modified to correct for the torque factor variation. Upon receipt of the position information when in seek, the linear model estimate is updated, including the distance to go to the target track. A desired velocity is determined and the velocity error $v_{es}$, the difference between the desired velocity and the actual velocity, is calculated. The velocity error is filtered, and the result is the desired control u. The windage estimate W* is added to u and the sum is then scaled by RGKHAT, the ratio of the nominal torque factor to the actual torque factor at the current position, as described in the '644 patent.

As shown also in FIG. 2, the result is output to the DAC 62 and the Linear Model Prediction is updated using u.

Figure 10:
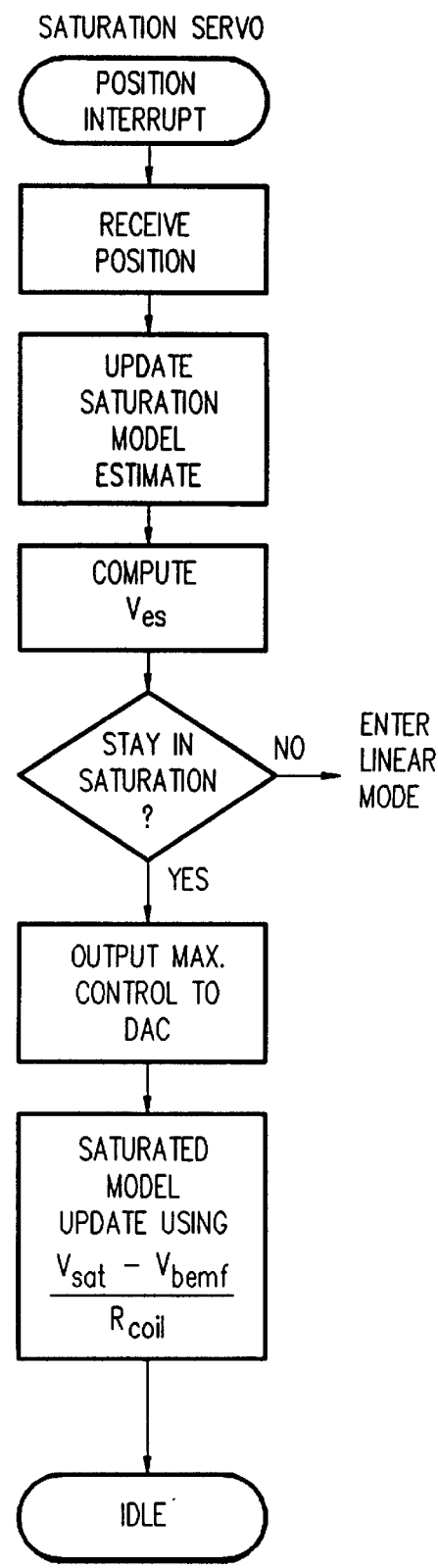
FIG. 10 illustrates a flow chart for the prior art state estimator Saturation Model Estimate and the Saturation Model Prediction and Update shown in FIG. 2, and showing in more detail many of the steps shown in FIG. 2.

FIG. 10 illustrates a flow chart for the prior art state estimator Saturation Model Estimate and the Saturation Model Prediction and Update shown in FIG. 2, and showing in more detail many of the steps shown in FIG. 2. Upon receipt of the position information when in seek, the saturation model is updated, including the distance to go to the target track. A desired velocity is determined and the velocity error $v_{es}$ is calculated. If $v_{es}$ still exceeds the threshold, the saturation seek mode is to be maintained and the maximum control is output to the DAC 62. The nominal saturation model is updated, adjusting the acceleration to account for the back EMF reduction of the effective current. In the formula in FIG. 10, $V_{sat}$ is the largest voltage the power supply can output, $V_{bemf}$ is the voltage across the coil due to its motion, and $R_c$ is the nominal coil resistance.

Figure 11:
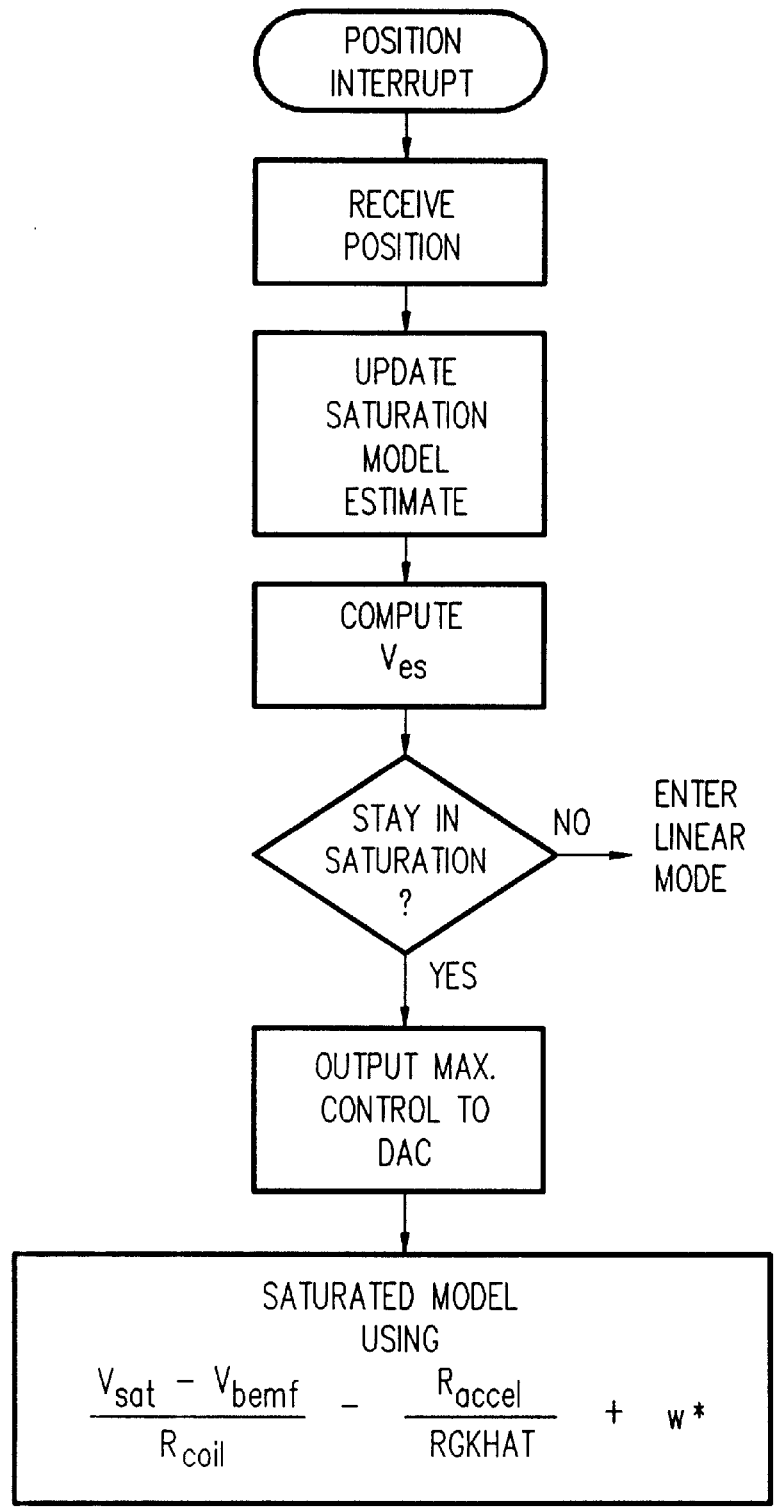
FIG. 11 illustrates a flow chart for the state estimator of the present invention as implemented in the Saturated Model Estimate and the Saturation Model Prediction and Update shown in FIG. 4.

FIG. 11 illustrates a flow chart for the state estimator of the present invention as implemented in the Saturated Model Estimate and the Saturation Model Prediction and Update shown in FIG. 2. Upon receipt of the position information, the saturation model is updated, including the distance to go to the target track. A desired velocity is determined and the velocity error $v_{es}$ is calculated. If $v_{es}$ still exceeds the threshold, the saturation seek mode is to be maintained and the maximum control is output to the DAC 62. In the formula in FIG. 11, $V_{sat}$, $V_{bemf}$, and $R_c$ are the same as for the nominal model so as to correct the maximum current for the back EMF. Then, according to the present invention, the saturated model is changed and updated. The change to the model comes from the factors $R_{accel}$, RGKHAT and W*. RGKHAT is the ratio of the actual torque factor at the current position to the nominal torque factor, and is obtained from the linear model of FIG. 9. $R_{accel}$ is the ratio of acceleration measured in the file to that calculated using nominal coil resistance and nominal saturation voltage. The inverted RGKHAT is the equivalent of $K_1$ in FIG. 8. W* is the estimate of the static windage.

Figure 12:
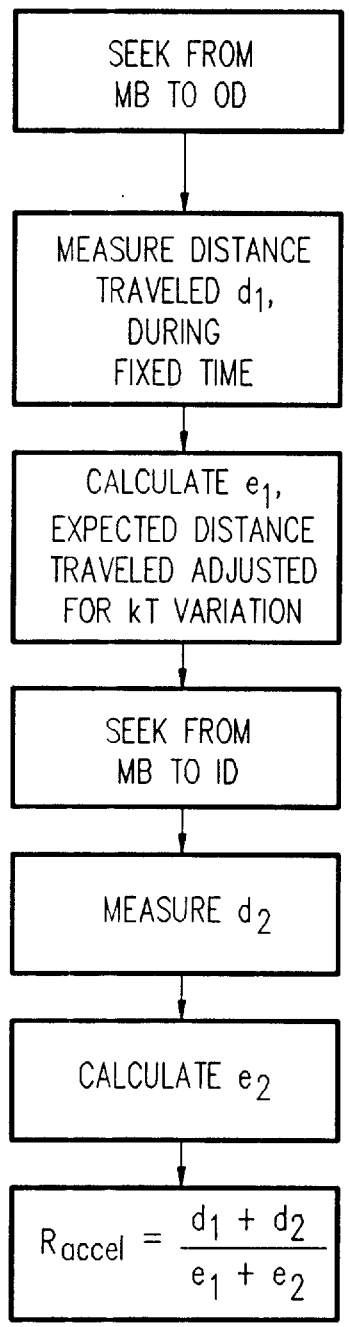
FIG. 12 and FIG. 13 illustrate alternative methods for determining the ratio of acceleration measured in the file to that calculated using nominal coil resistance and nominal saturation voltage for use in the state estimator of FIG. 11.
Figure 13:
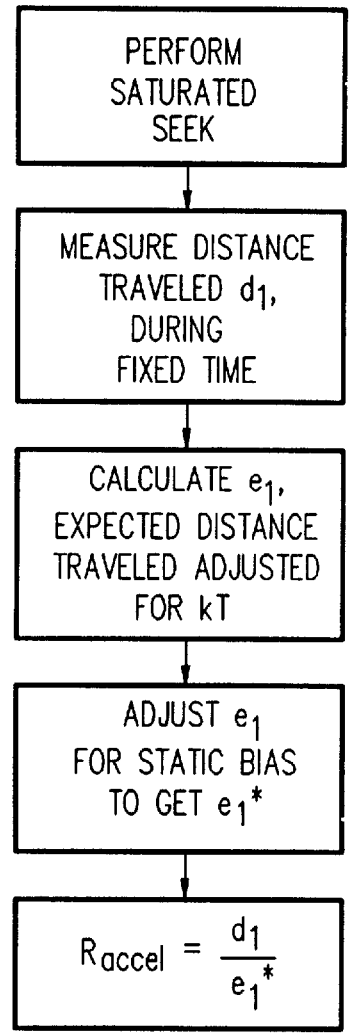

FIG. 12 and FIG. 13 illustrate alternative methods for determining $R_{accel}$.

The method shown in FIG. 12 is useful during RECAL or "rezero" and comprises issuing a saturating seek, preferably from a stationary position in order to reduce the effects of back EMF, from a middle band to the outside diameter (OD). The distance travelled during a fixed time during the seek, $d_1$, is measured. The expected distance to be travelled during the fixed time, adjusted for the torque variation, $e_1$, is calculated. Then, a reverse seek from a middle band to the inside diameter (ID) is conducted. The distance travelled during the same fixed time during the reverse seek, $d_2$, is measured. Again, the expected distance to be travelled during the fixed time, adjusted for the torque variation, $e_2$, is calculated. The $R_{accel}$ is calculated by averaging the ratios of actual to expected distances travelled in the two directions as shown.

The method shown in FIG. 13 may be conducted at a set time during any sufficiently long saturated seek in a single direction. During the seek, and again preferably at the beginning of the seek when the back EMF is low, the distance travelled during a fixed time, $d_1$, is measured. The expected distance to be travelled during the fixed time, adjusted for the torque variation, $e_1$, is calculated. The expected distance is adjusted for the static windage or bias to get the corrected expected distance travelled $e^*_1$. The $R_{accel}$ is calculated by taking the ratio of $d_1$ to $e^*_1$. Other variations of the computations will be obvious to those skilled in the art. $R_{accel}$ is the equivalent of $K_2$ in FIG. 8.

Figure 14:
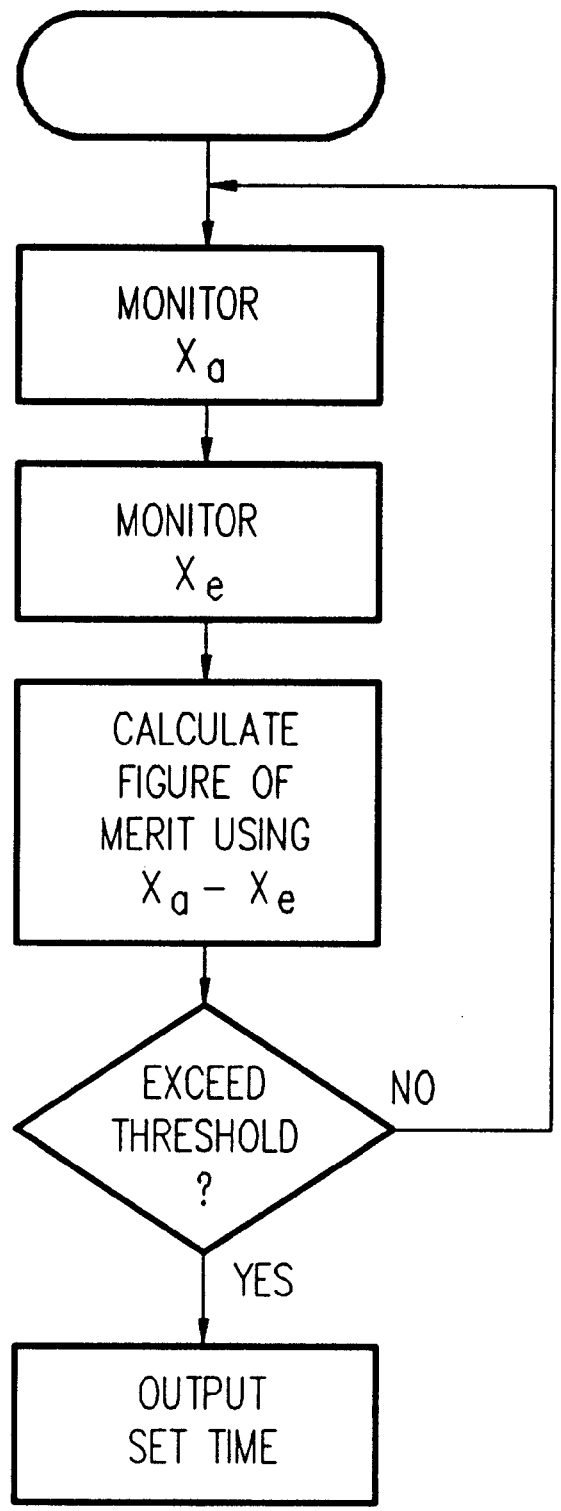
FIG. 14 is a flow chart illustrating the determination of set times at which to rezero or to redetermine ratios used in the state estimator of FIG. 11.

Lastly, the determination of set times at which to rezero or to redetermine RGKHAT and/or $R_{accel}$ is shown in FIG. 14. The position sample $x_a$ and the estimated position $x_e$ are monitored during a measurement time. A figure of merit using the difference between the actual and estimated positions is calculated and compared to a threshold. If the threshold is exceeded a recalibration of the maximum acceleration or of the torque factor is requested by establishing a set time signal. The figure of merit may be calculated at fixed times, for example, at the end of seek when overshoot is most likely.

Alternatively, the size of the estimator error (the difference between the estimator's prediction of position and the measured position for one sample) can be monitored, and a recalibration scheduled as needed.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a servo system for a data recording disk file, said disk file having a voice coil motor (VCM) actuator for seek repositioning a head from one data track to a target data track, said VCM having a characteristic torque factor which varies in accordance with a predetermined relationship to head position, said servo system capable of driving said VCM in a nonsaturated seek mode relating head acceleration to coil current, and said servo system capable of driving said VCM in a saturated seek mode at a maximum level of current, said maximum level of current having a low frequency variation; said servo system sampling head position servo information (position sample) at discrete sample times, calculating a distance to go to the target track, computing, from said position sample, current estimates of the state of the VCM including head position and velocity, and computing, from an algorithmic model relating to said state of the VCM, predictions of head position and velocity, and generating therefrom a digital control signal for driving said VCM; a method for compensating for differences of factors of the VCM and servo system in saturated seek mode comprising the steps of:

1) storing at least one scaling factor representing the ratio of measured said differences of the VCM and servo system in saturated seek mode to nominal;
2) scaling said VCM by said scaling factor(s); and
3) computing predictions of the state of the VCM in saturated seek mode from said scaled estimates and the current values of said states.

2. The method of claim 1, additionally including the steps of:

4) at set times, conducting a constant nonsaturating control for a fixed measurement time;
5) determining the ratio of expected to actual distance traveled in step 4 after taking into account the effects of windage;
6) calculating from said ratio in step 5 the ratio of actual to nominal of at least one of said scaling factor(s); and
7) updating said scaling factor(s).

3. The method of claim 2, additionally including the steps of:

8) at set times, conducting a saturating control for a fixed measurement time;
9) determine the ratio of expected to actual distance traveled in step 8 after taking into account the effects of windage and said updated scaling factor(s);
10) calculating from said ratio in step 9 the ratio of actual to nominal of at least another of said scaling factor(s); and
11) updating said another of said scaling factors.

4. The method of claim 3, additionally including the steps of:

12) monitoring said position sample and said computed estimated position; and
13) upon a figure of merit calculated using the difference between said position sample and said computed estimated position exceeding a threshold, setting said set times.

5. The method of claim 1, additionally including the steps of:

4) at set times, conducting a saturating control for a fixed measurement time;
5) determining the ratio of expected to actual distance traveled in step 4 after taking into account the effects of windage and said scaling factor(s);
6) calculating from said ratio in step 5 the ratio of actual to nominal of at least one of said scaling factor(s); and
7) updating said scaling factor(s).

6. The method of claim 2, wherein said computing predictions of step 3 additionally comprises:

3A) computing said predictions by additionally adjusting for said effects of windage.

7. In a servo system for a data recording disk file, said disk file having a voice coil motor (VCM) actuator for seek repositioning a head from one data track to a target data track, said VCM having a characteristic torque factor which varies in accordance with a predetermined relationship to head position, said servo system capable of driving said VCM in a nonsaturated seek mode relating head acceleration to coil current, and said servo system capable of driving said VCM in a saturated seek mode at a maximum level of current, said maximum level of current having a low frequency variation; said servo system sampling head position servo information (position sample) at discrete sample times, calculating distance to go to the target track, computing an estimated VCM control representing the VCM current, and computing, from an algorithmic model relating to said position sample, current estimates of the state of the VCM including head position and velocity, and computing, from an algorithmic model relating to said control, predictions of head position and velocity, said computing estimated control including calculating a ratio of nominal torque factor to measured torque factor, including a measured offset from an average ratio, and generating a digital control signal for driving said VCM; a method for compensating for differences of torque factor of the VCM and for variation in said maximum level of current in saturated seek mode comprising the steps of:

1) storing a first scaling factor representing the ratio of measured maximum level of current to nominal;
2) storing a second scaling factor representing the ratio of measured torque factor to nominal torque factor;
3) scaling said estimated VCM control by said second scaling factor and said first scaling factor; and
4) computing predictions of the state of the VCM in saturated seek mode from said scaled control and the current values of said states.

8. The method of claim 7, additionally including at set times the steps of:

5) measuring the offset to the ratio of the average to nominal torque factor;
6) measuring the ratio of the maximum level of current to nominal; and
7) updating said offset and said first scaling factor.

9. The method of claim 8, additionally including the steps of:

8) monitoring said position sample and said computed estimated position; and
9) upon a figure of merit calculated using the difference between said position sample and said computed estimated position exceeding a threshold, setting said set time.

10. In a servo system for a data recording disk file, said disk file having a voice coil motor (VCM) actuator for seek repositioning a head from one data track to a target data track, said VCM having a characteristic torque factor which varies in accordance with a predetermined relationship to head position, said servo system capable of driving said VCM in a nonsaturated seek mode relating head acceleration to coil current, and said servo system capable of driving said VCM in a saturated seek mode at a maximum level of current; said servo system sampling head position servo information (position sample) at discrete sample times, calculating a distance to go to the target track, computing an estimated VCM control for said nonsaturated seek mode representing the VCM current, and computing, from an algorithmic model relating to said position sample, current estimates of the state of the VCM including head position and velocity, and computing, from an algorithmic model relating to said control, predictions of head position and velocity, said nonsaturated computing including calculating a ratio of nominal torque factor to measured torque factor, including a measured offset from an average ratio, and generating a digital control signal for driving said VCM; a method for compensating for differences of torque factor of the VCM in saturated seek mode comprising the steps of:

1) storing a torque scaling factor calculated by inverting said ratio of nominal torque factor to measured torque factor;
2) scaling said estimated VCM control by said torque scaling factor; and
3) computing predictions of the state of the VCM in saturated seek mode from said scaled control and the current values of said states.

11. The method of claim 10, additionally including at set times the steps of:

4) conducting a constant nonsaturating control for a fixed measurement time;
5) determining the ratio of expected to actual distance traveled in step 4 after taking into account the effects of windage;
6) calculating from said ratio in step 5 the offset to the ratio of the average to nominal torque factor; and
7) updating said offset.

12. The method of claim 11, additionally, including the steps of:

8) monitoring said position sample and said computed estimated position; and
9) upon a figure of merit calculated using the difference between said position sample and said computed estimated position exceeding a threshold, setting said set time.

13. The method of claim 11, wherein said computing predictions of step 3 additionally comprises:

3A) computing said predictions by additionally adjusting for said effects of windage.

14. In a servo system for a data recording disk file, said disk file having a voice coil motor (VCM) actuator for seek repositioning a head from one data track to a target data track, said VCM having a characteristic torque factor which varies in accordance with a predetermined relationship to head position, said servo system capable of driving said VCM in a nonsaturated seek mode relating head acceleration to coil current, and said servo system capable of driving said VCM in a saturated seek mode at a maximum level of current, said maximum level of current having a low frequency variation; said servo system sampling head position servo information (position sample) at discrete sample times, calculating a distance to go to the target track, computing an estimated VCM control for said nonsaturated seek mode representing the VCM current, and computing, from an algorithmic model relating to said position sample, current estimates of the state of the VCM including head position and velocity, and computing, from an algorithmic model relating to said control, predictions of head position and velocity, said nonsaturated computing including calculating a ratio of nominal torque factor to measured torque factor, including a measured offset from an average ratio, and generating a digital control signal for driving said VCM; a method for compensating for differences of torque factor of the VCM and for variation in said maximum level of current in saturated seek mode comprising the steps of:

1) storing a first scaling factor representing the ratio of measured maximum level of current to nominal;
2) storing a second scaling factor calculated by inverting said ratio of measured torque factor to nominal torque factor;
3) scaling said estimated VCM control by said second scaling factor and said first scaling factor; and
4) computing predictions of the state of the VCM in saturated seek mode from said scaled control and the current values of said states;
5) at set times, conducting a constant nonsaturating control for a fixed measurement time;
6) determining the ratio of expected to actual distance traveled in step 5 after taking into account the effects of windage;
7) calculating from said ratio in step 6 the offset to the ratio of the average to nominal torque factor;
8) conducting a saturating control for a fixed measurement time;
9) determine the ratio of expected to actual distance traveled in step 8 after taking into account the effects of windage and torque variation;
10) calculating from said ratio in step 9 the ratio of the maximum level of current to nominal; and 11) updating said offset and said first scaling factor.

15. The method of claim 14, additionally including the steps of:

12) monitoring said position sample and said computed estimated position; and 13) upon a figure of merit calculated using the difference between said position sample and said computed estimated position exceeding a threshold, setting said set time.

16. In a servo system for a data recording disk file, said disk file having a voice coil motor (VCM) actuator for seek repositioning a head from one data track to a target data track, said VCM having a characteristic torque factor which varies in accordance with a predetermined relationship to head position, said servo system capable of driving said VCM in a nonsaturated seek mode relating head acceleration to coil current, and said servo system capable of driving said VCM in a saturated seek mode at a maximum level of current, said maximum level of current having a low frequency variation; said servo system sampling head position servo information (position sample) at discrete sample times, calculating a distance to go to the target track, computing an estimated VCM control for said nonsaturated seek mode representing the VCM current, and computing, from an algorithmic model relating to said position sample, current estimates of the state of the VCM including head position and velocity, and computing, from an algorithmic model relating to said control, predictions of head position and velocity, and generating a digital control signal for driving said VCM; a method for compensating for differences of factors of the VCM and servo system in saturated seek mode comprising the steps of:

1) storing at least one scaling factor representing the ratio of measured said differences of the VCM and servo system in saturated seek mode to nominal;

2) scaling said estimated VCM control by said scaling factor(s);

3) computing said predictions of the state of the VCM in saturated seek mode from said scaled control and the current values of said states;

4) at set times, conducting a saturating control for a fixed measurement time;

5) determining the ratio of expected to actual distance traveled in step 4 after taking into account the effects of windage;

6) calculating from said ratio in step 5 the ratio of actual to nominal of another of said scaling factors; and 7) updating said scaling factors.

17. The method of claim 16, additionally including the steps of:

8) monitoring said position sample and said computed estimated position; and 9) upon a figure of merit calculated using the difference between said position sample and said computed estimated position exceeding a threshold, setting said set time.

18. An improved data recording disk file of the type having at least one rotatable disk with generally concentric data tracks thereon, the data disk or a separate servo disk having servo information recorded thereon; at least one head for reading the servo information during rotation of the disk; a voice coil motor (VCM) actuator for seek repositioning a head from one data track to a target data track, said VCM having a characteristic torque factor which varies in accordance with a predetermined relationship to head position; a servo system for driving said VCM in a nonsaturated seek mode relating head acceleration to coil current, and said servo system for driving said VCM in a saturated seek mode at a maximum level of current, said maximum level of current having a low frequency variation; a servo digitizing channel for processing the servo information read by said head to provide head position information (position sample) at discrete sample times; a microprocessor for calculating a distance to go to the target track, computing from said position sample, current estimates of the state of the VCM including head position and velocity, and computing, from an algorithmic model relating to said state of the VCM, predictions of head position and velocity, and generating a digital control signal for driving said VCM; wherein the improvement comprises:

memory associated with said microprocessor for storing at least one scaling factor representing the ratio of measured differences of the VCM and servo system in saturated seek mode to nominal; and wherein said microprocessor scales said VCM by said scaling factor(s); and said microprocessor computes said predictions of the state of the VCM in saturated seek mode from said scaled factor and the current values of said states.

19. The improved disk file according to claim 18 wherein:

said servo system, at set times, conducts a constant nonsaturating control for a fixed measurement time;

said microprocessor calculates the distance travelled by the head for said fixed measurement time, computes the ratio of expected to actual distance traveled after taking into account the effects of windage, calculates from said ratio the ratio of actual to nominal of at least one of said scaling factor(s); and updates said scaling factor(s).

20. The improved disk file according to claim 19 wherein:

said microprocessor computes said predictions additionally adjusting for said effects of windage.

* * * * *